(No Model.)
D. PATTEE.
VALVE FOR STEAM ENGINES.
No. 473,953. Patented May 3, 1892.
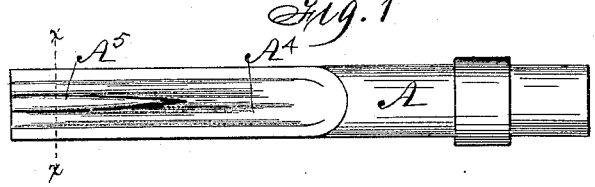
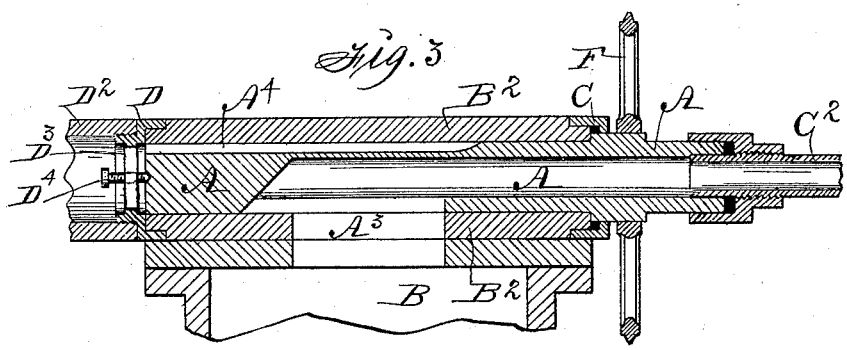
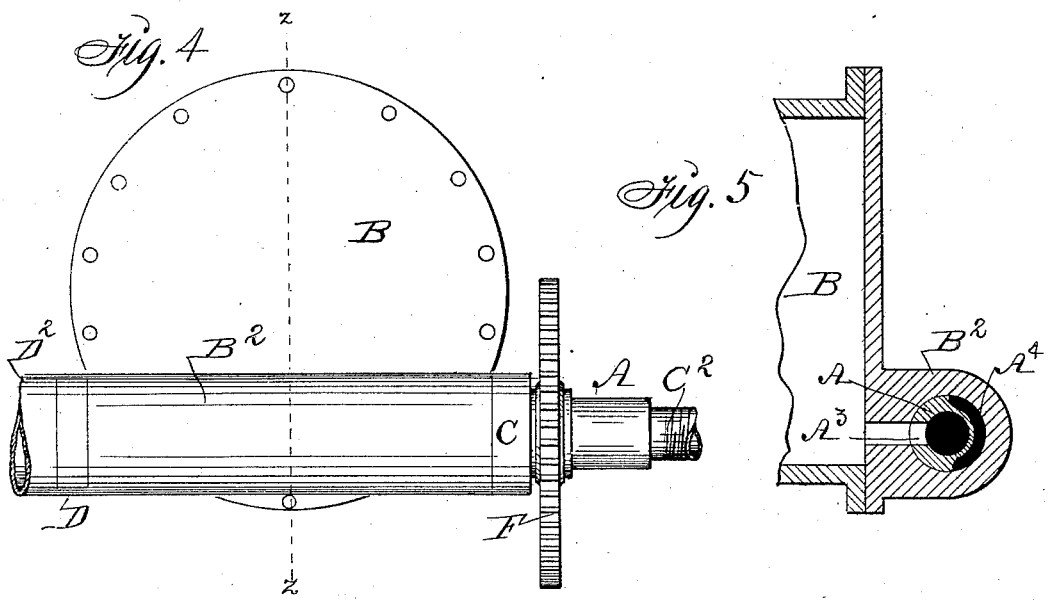

UNITED STATES PATENT OFFICE.

DAVIS PATTEE, OF DES MOINES, IOWA.

VALVE FOR STEAM-ENGINES.

SPECIFICATION forming part of Letters Patent No. 473,953, dated May 3, 1892.

Application filed June 4, 1891. Serial No. 395,146. (No model.)

*To all whom it may concern:*

Be it known that I, DAVIS PATTEE, a citizen of the United States, residing at Des Moines, in the county of Polk and State of Iowa, have invented a new and useful Valve for Steam-Engines, of which the following is a specification.

My object is to provide and combine a valve with the cylinder of an engine in such a manner that it can be advantageously operated by mechanism for rotating it or mechanism for imparting reciprocating rotary motion thereto; and my invention consists in the construction of a valve and valve-chamber and arranging and combining them with a cylinder, as hereinafter set forth, pointed out in the claims, and illustrated in the accompanying drawings, in which—

Figure 1 is a view showing the outside form of the valve, and Fig. 2 is a transverse sectional view through the line $x\ x$ of Fig. 1. Fig. 3 is longitudinal sectional view showing the valve-chamber combined with a cylinder and the valve in position in the chamber, as required, to establish communication between a steam-supply pipe and the cylinder. Fig. 4 is an end view of a cylinder, showing the valve-chamber integral therewith; and Fig. 5 is a vertical sectional view through the line $z\ z$ of Fig. 4.

A represents the valve in the form of a tube, that has a solid closed end $A^2$, a longitudinal slot or port $A^3$ at its central portion, and an exhaust-port $A^4$ on its outside face directly opposite from the port $A^3$. The exhaust-port extends from the central portion to the end, as clearly shown in Figs. 1 and 2, and its outer portion is divided by a rib $A^5$, that prevents any lateral motion of the valve relative to its longitudinal axis when the valve is operated in the valve-chamber.

B represents a steam-cylinder, and $B^2$ a valve-chamber formed integral therewith or fixed thereto to project outward therefrom, as clearly shown in Fig. 5.

$B^3$ is a longitudinal slot or port in the cylinder-head communicating with the valve-chamber and with the valve when the port in the valve is in coinciding position, as shown in Figs. 2 and 5.

C represents a stuffing-box at the end of the valve-chamber and the end portion of the valve, that is connected with a steam-supply pipe $C^2$ in such a manner that the valve can rotate while the pipe remains stationary.

D is a tubular coupling fitted and fixed to the other end of the valve-chamber and adapted for connecting a steam-exhaust tube $D^2$ therewith.

$D^3$ is a cross-bar in the coupling, and $D^4$ is a screw-pivot extended through the bar and into the center of the solid end portion $A^2$ of the valve.

F represents a wheel attached to the valve A, through which rotary motion or reciprocating rotary motion can be imparted to the valve to convey steam into and out of the cylinder, as required, to operate a piston in the cylinder.

I claim as my invention—

1. A tubular valve having one solid end, a slot or port extending longitudinally in its central portion, and an exhaust-port on the outside face of the valve, extending from its central portion and over the solid end portion and divided at its outer end by an elongated rib, in combination with a valve-chamber and a cylinder having slots or ports corresponding with the port in the central portion of the valve, to operate in the manner set forth, for the purposes stated.

2. The tubular valve A, having a closed end $A^2$, an elongated port $A^3$, and an exhaust-port $A^4$, divided by a rib $A^5$, in combination with a valve-chamber $B^2$, having a port $B^3$, a steam-supply pipe $C^2$, and means for actuating the valve, for the purposes stated.

3. In a steam-engine, a cylindrical valve-chamber having an elongated slot at its central portion, a tubular valve fitted in said chamber and provided with an elongated slot or port in its central portion, and an exhaust-port in its outside surface extending from its central portion to its end, a steam-cylinder having a slot or port corresponding with the port in the valve-chamber, a supply-pipe connected with the end of the valve, and means for actuating the valve, arranged and combined to operate in the manner set forth, for the purposes stated.

DAVIS PATTEE.

Witnesses:
J. RALPH ORWIG,
THOMAS G. ORWIG.